United States Patent [19]
Inouye

[11] Patent Number: 4,972,693
[45] Date of Patent: Nov. 27, 1990

[54] VEHICLE ANTI-THEFT DEVICE

[76] Inventor: Keiichi Inouye, 1559 Ridge Rd., Vista, Calif. 92083

[21] Appl. No.: 395,994

[22] Filed: Aug. 21, 1989

[51] Int. Cl.⁵ .................... E05B 65/12; B60R 25/06
[52] U.S. Cl. ........................................ 70/238; 70/247
[58] Field of Search ............... 70/238, 199, 247, 202, 70/203; 180/287

[56] References Cited

U.S. PATENT DOCUMENTS

| | | |
|---|---|---|
| 4,008,589 | 2/1977 | Harrell . |
| 4,076,095 | 2/1978 | Adamski . |
| 4,096,930 | 6/1978 | Viscardi . |
| 4,432,432 | 2/1984 | Martin . |
| 4,627,514 | 12/1986 | Brown . |
| 4,835,999 | 6/1989 | Chant ................................ 70/238 |

FOREIGN PATENT DOCUMENTS

| | | | |
|---|---|---|---|
| 925217 | 8/1947 | France ................... 70/238 |
| 2465617 | 4/1981 | France ................... 70/203 |
| 1162018 | 8/1969 | United Kingdom ........ 70/202 |
| 2021499 | 12/1979 | United Kingdom ........ 70/203 |
| 2024128 | 1/1980 | United Kingdom ........ 70/202 |
| 2142889 | 1/1985 | United Kingdom ........ 70/247 |

Primary Examiner—Charles A. Marmor
Assistant Examiner—Karin Tyson
Attorney, Agent, or Firm—Jerry T. Kearns

[57] ABSTRACT

A vehicle anti-theft device allows a floor mounted gear shift lever and a floor mounted parking brake lever to be locked together to prevent vehicle theft. An elongated hollow rectangular mounting bar receives an elongated rectangular gear shift locking member in telescopic relation for selected extension and retraction. A bifurcated yoke portion on a distal end of the gear shift locking member is dimensioned for engagement with a floor mounted vehicle lever. An elongated hollow rectangular parking brake locking member is obliquely secured on a bottom surface of the mounting bar and has an open distal end dimensioned for insertion of a floor mounted vehicle parking brake lever. A plurality of apertures are spaced along the gear shift locking member for cooperation with a locking bolt mounted for extension and retraction through an aperture formed in the mounting bar. A key actuated locking cylinder manually actuates the locking bolt for securing the device in a locked condition on the vehicle floor mounted parking brake and gear shift levers.

1 Claim, 3 Drawing Sheets

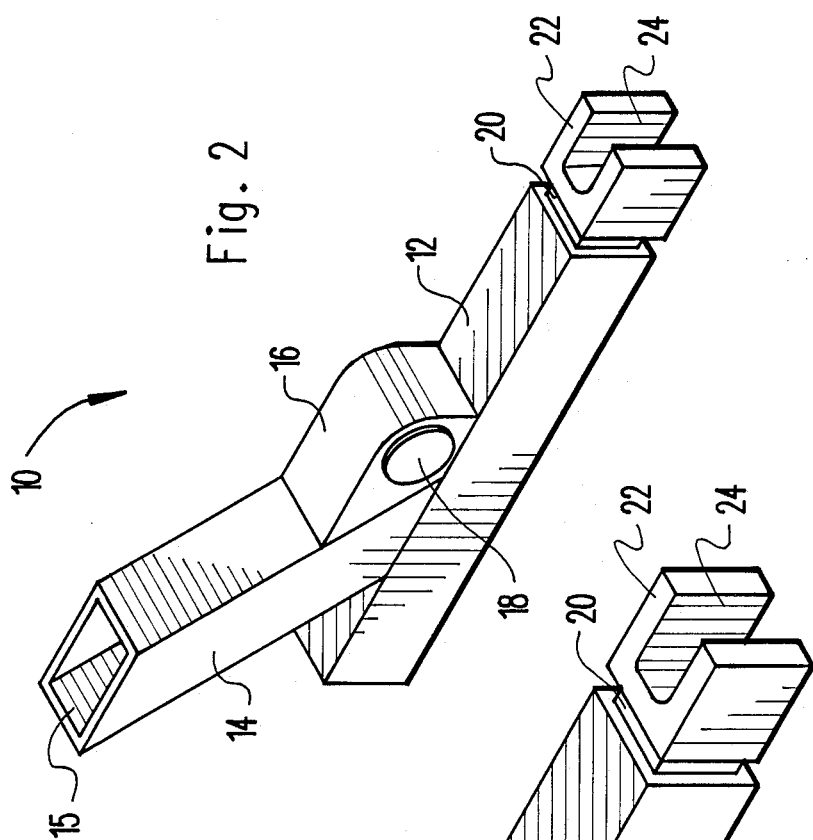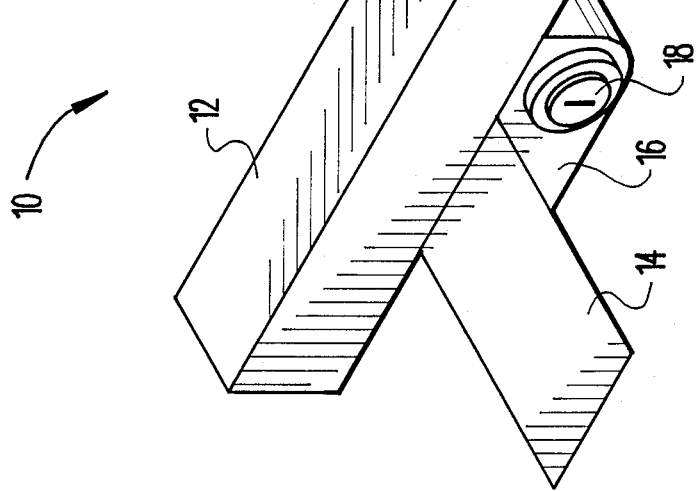

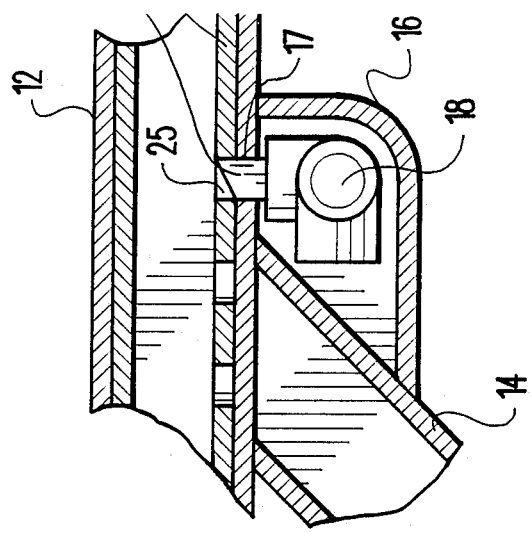
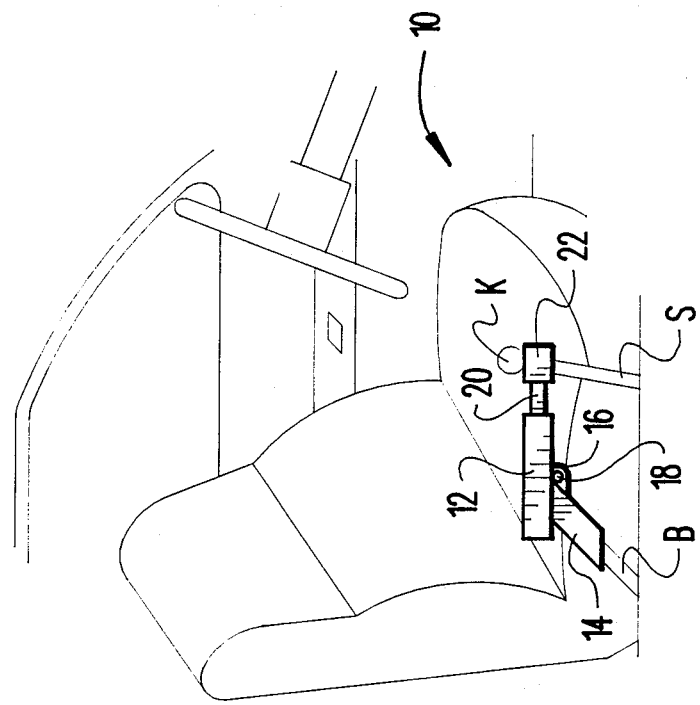

VEHICLE ANTI-THEFT DEVICE

BACKGROUND OF THE INVENTION

1. Field of the Invention

The present invention relates to vehicle anti-theft devices, and more particularly pertains to a combination lock for engagement with a vehicle floor mounted parking brake lever and a vehicle floor mounted gear shift lever. Many vehicles are provided with a parking brake actuated by a floor mounted elongated pivotal lever. Release of the parking brake requires that a button on the end of the parking brake lever be first depressed. These vehicles are also typically provided with a floor mounted manual or automatic gear shift lever having a range of movement to control the vehicle's transmission. The present invention provides an anti-theft device for simultaneously locking both of these controls in an inoperative orientation.

2. Description of the Prior Art

Various types of vehicle anti-theft devices are known in the prior art. A typical example of such a vehicle anti-theft device is to be found in U.S. Pat. No. 4,008,589, which issued to W. Harrell on Feb. 22, 1977. This patent discloses a steering column mounted shackle to prevent tampering with a vehicle ignition switch. U.S. Pat. No. 4,076,095, which issued to R. Adamski on Feb. 28, 1978, discloses a locking bar for locking vehicle control pedals together and against vertical movement. U.S. Pat. No. 4,096,930, which issued to F. Viscardi on June 27, 1978, discloses an interlock mechanism for preventing inadvertent movement of a motor vehicle gear shift selector unless a motor vehicle brake pedal is depressed. U.S. Pat. No. 4,432,432, which issued to N. Martin on Feb. 21, 1984, discloses a combined steering wheel lock and brake pedal lock formed by attachment of adaptor elements to a standard vehicle bumper jack. U.S. Pat. No. 4,627,514, which issued to C. Brown on Dec. 9, 1986, discloses an anti-theft shackle for mounting on a vehicles steering column.

While the above mentioned devices are directed to various vehicle anti-theft devices, none of these devices is capable of simultaneously locking a vehicle floor mounted parking brake lever and a vehicle floor mounted gear shift lever. Inasmuch as the art is relatively crowded with respect to these various types of vehicle anti-theft devices, it can be appreciated that there is a continuing need for and interest in improvements to such vehicle anti-theft devices, and in this respect, the present invention addresses this need and interest.

SUMMARY OF THE INVENTION

In view of the foregoing disadvantages inherent in the known types of vehicle anti-theft devices now present in the prior art, the present invention provides an improved vehicle anti-theft device. As such, the general purpose of the present invention, which will be described subsequently in greater detail, is to provide a new and improved vehicle anti-theft device which has all the advantages of the prior art vehicle anti-theft devices and none of the disadvantages.

To attain this, a representative embodiment of the concepts of the present invention is illustrated in the drawings and makes use of a vehicle anti-theft device which allows a floor mounted gear shift lever and a floor mounted parking brake lever to be locked together to prevent vehicle theft. An elongated hollow rectangular mounting bar receives an elongated rectangular gear shift locking member in telescopic relation for selected extension and retraction. A bifurcated yoke portion on a distal end of the gear shift locking member is dimensioned for engagement with a floor mounted vehicle lever. An elongated hollow rectangular parking brake locking member is obliquely secured on a bottom surface of the mounting bar and has an open distal end dimensioned for insertion of a floor mounted vehicle parking brake lever. A plurality of apertures are spaced along the gear shift locking member for cooperation with a locking bolt mounted for extension and retraction through an aperture formed in the mounting bar. A key actuated locking cylinder manually actuates the locking bolt for securing the device in a locked condition on the vehicle floor mounted parking brake and gear shift levers.

There has thus been outlined, rather broadlY, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology emploYed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle anti-theft device which has all the advantages of the prior art vehicle anti-theft devices and none of the disadvantages.

It is another object of the present invention to provide a new and improved vehicle anti-theft device which may be easily and efficiently manufactured and marketed.

It is a further object of the present invention to provide a new and improved vehicle anti-theft device which is of a durable and reliable construction.

An even further object of the present invention is to provide a new and improved vehicle anti-theft device which is susceptible of a low cost of manufacture with regard to both materials and labor, and which accordingly is then susceptible of low prices of sale to the consuming public, thereby making such vehicle anti-theft devices economically available to the buying public.

Still yet another object of the present invention is to provide a new and improved vehicle anti-theft device which provides in the apparatuses and methods of the prior art some of the advantages thereof, while simultaneously overcoming some of the disadvantages normally associated therewith.

Still another object of the present invention is to provide a new and improved vehicle anti-theft device to lock a vehicle parking brake lever and a vehicle transmission shift lever in an operative position.

Yet another object of the present invention is to provide a new and improved vehicle anti-theft device for locking floor mounted vehicle parking brake and transmission shift levers in an inoperative position.

Even still another object of the present invention is to provide a new and improved vehicle anti-theft device which is adaptable for use with various different vehicles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top front side perspective view of the anti-theft device of the present invention.

FIG. 2 is a bottom rear side perspective view of the anti-theft device of the present invention.

FIG. 6 is a diagrammatic view illustrating the manner of use of the anti-theft device of the present invention.

FIG. 7 is a cross sectional view illustrating the construction of the key actuated locking mechanism.

DESCRIPTION OF THE PREFERRED EMBODIMENT

Figure 3:
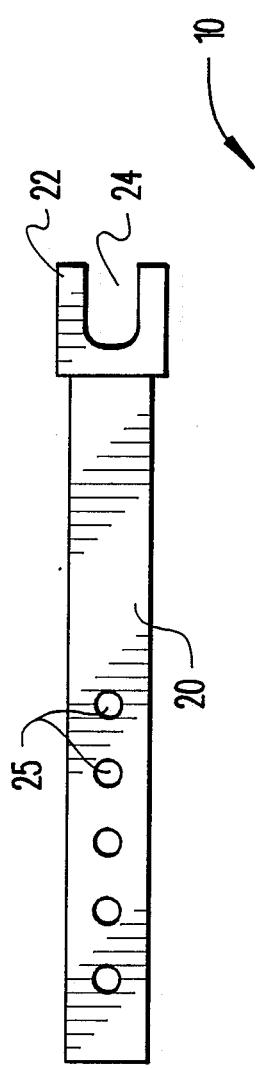
FIG. 3 is a plan view illustrating the extensible gear shift locking member of the anti-theft device of the present invention.

With reference now to the drawings, and in particular to FIG. 1 thereof, a new and improved vehicle anti-theft device embodying the principles and concepts of the present invention and generally designated by the reference numeral 10 will be described.

More specifically, it will be noted that the first embodiment 10 of the invention includes an elongated hollow rectangular mounting bar 12, preferably formed from a hardened steel material. An elongated rectangular gear shift locking member 20 is received for extension and retraction in telescopic relation within the mounting bar 12. A bifurcated yoke portion 22 is secured on a distal end of the gear shift locking member 20 and includes a slot 24 dimensioned for engagement with a floor mounted vehicle gear shift lever. It should be noted that the anti-theft device 10 of the present invention may be utilized with vehicles having either a manual or an automatic transmission, as long as a floor mounted shift lever is provided. An elongated hollow rectangular parking brake locking member 14 is obliquely secured on a bottom surface of the mounting bar 12. A locking mechanism housing 16 is secured on a bottom surface of the mounting bar 12 and to a forward surface of the parking brake locking member 14. The locking mechanism includes a key actuated locking cylinder 18 operative to lock the gear shift locking member 20 in a selected extended or retracted position.

As shown in FIG. 2, the parking brake locking member 14 has an open distal end 15 dimensioned for insertion of a floor mounted vehicle parking brake lever. It should be noted that the typical parking brake lever has a push button provided at an upper end thereof which must be depressed in order to release the parking brake. Release of the parking brake is thus prevented when the upper end of the parking brake lever is received within the interior of the parking brake locking member 14. The various components of the anti-theft device 10 are preferably formed from a hardened steel material and may be secured bY welding. The parking brake locking member 14 has opposite beveled ends to provide an oblique securement with the bottom surface of the mounting bar 12. The locking mechanism housing 16 provides a reinforcing member for the parking brake locking member 14.

As shown in FIG. 3, the gear or transmission shift locking member 20 is provided with a plurality of spaced circular apertures 25. The apertures 25 cooperate with a locking bolt within the locking mechanism housing 16, in a manner to be described subsequently.

Figure 4:
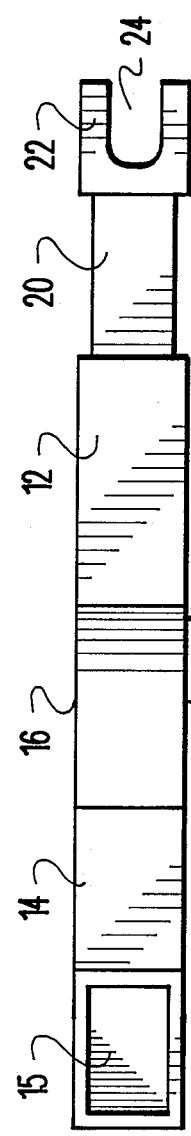
FIG. 4 is a bottom plan view of the anti-theft device of FIG. 1.

FIG. 4 is a bottom plan view of the anti-theft device 10.

Figure 5:
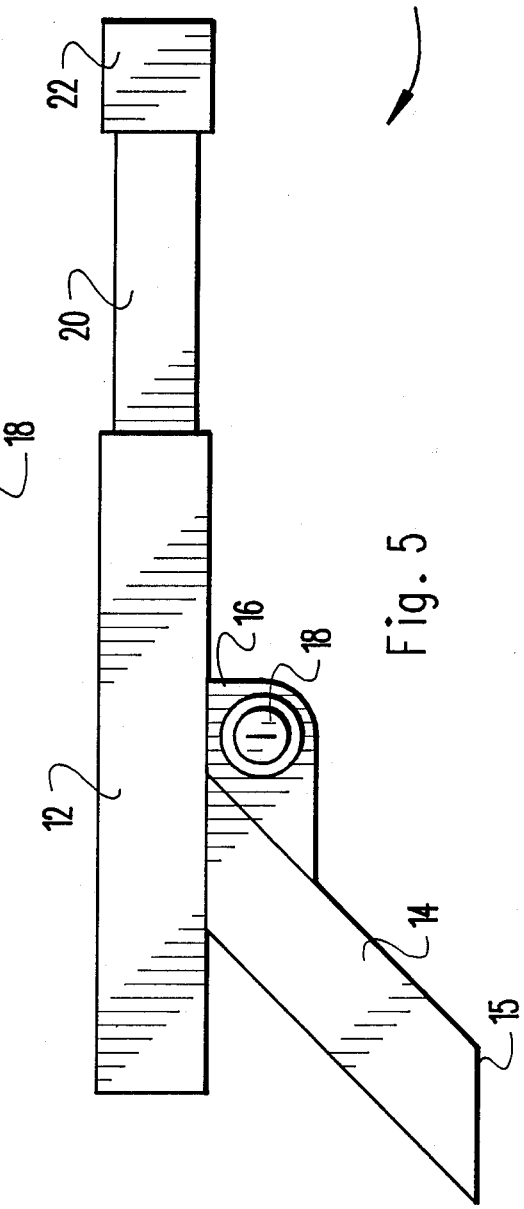
FIG. 5 is a side view of the anti-theft device of FIG. 1, with the transmission locking member in an extended position.

FIG. 5 is a side elevational view of the anti-theft device 10, illustrating the gear or transmission shift locking member 20 in an extended position.

FIG. 6 illustrates the manner of use of the locking device 10, in a vehicle equipped with a floor mounted parking brake lever B and a floor mounted transmission shift lever S. As described previously, the shift lever S may be of the type utilized in a manual or an automatic transmission. The shift lever S terminates at an upper end in a knob K. In use, the shift lever S is moved to a forward park position, or in the case of a manual transmission to a forward low gear position. The parking brake lever B is then lifted to the illustrated raised or engaged position. The parking brake locking member 14 is then placed over the upper end of the brake lever B and the transmission shift locking member 20 is extended until the bifurcated yoke portion 22 is in engagement with the shift lever S. The key actuated locking cylinder 18 is then manually engaged to lock the transmission locking member 20 in a fully extended position. When locked in the extended position, the brake lever B and the shift lever S are wedged together to prevent relative movement of either lever. This provides a secure locking device which prevents a thief from stealing the vehicle, even if the ignition switch has been successfully defeated.

FIG. 7 is a cross sectional detail view which illustrates the construction of the locking mechanism. The key actuated locking cylinder is of a conventional type which includes a dead bolt type locking pin 19. The locking bolt 19 is mounted for extension and retraction through an aperture 17 provided in a bottom surface of the mounting bar 12. The locking bolt 19 is illustrated in a locked position, in engagement with a selected one of the apertures 25 which are spaced along the length of the transmission locking member 20. The interior components of the locking cylinder 18 are of a conventional construction, and may be of a variety of different conventional designs, without departing from the scope of the present invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle anti-theft device, for use in a vehicle having a floor mounted gear shift lever and a floor mounted parking brake lever, comprising:
   an elongated hollow mounting bar;
   an elongated gear shift locking member received for extension and retraction in telescopic relation within said mounting bar;
   a bifurcated yoke portion on a distal end of said gear shift locking member for engagement with a floor mounted vehicle gear shift lever;
   an elongated hollow parking brake locking member secured rigidly and obliquely on a bottom surface of said mounting bar, forming an obtuse including angle between a bottom surface of said mounting bar and a forward surface of said parking brake locking member, said parking brake locking member having an open end dimensioned for insertion of a floor mounted vehicle parking brake lever;
   a plurality of apertures spaced along said gear shift locking member;
   a locking mechanism housing secured to said bottom surface of said mounting bar and to said forward surface of said parking brake locking member, said locking mechanism housing located within said obtuse included angle, forming a reinforcing member for said parking brake locking mechanism;
   a locking bolt in said locking mechanism housing mounted for extension and retraction through an aperture formed in said mounting bar, said locking bolt dimensioned for engagement with a selected one of said plurality of apertures on said gear shift locking member; and
   a locking cylinder in said locking mechanism housing for manually actuating said locking bolt.

* * * * *